United States Patent
Chan et al.

(10) Patent No.: US 12,380,692 B2
(45) Date of Patent: Aug. 5, 2025

(54) ABANDONED OBJECT DETECTION

(71) Applicant: Intel Corporation, Santa Clara, CA (US)

(72) Inventors: Charmaine Rui Qin Chan, Tanjung Bungah (MY); Chia Chuan Wu, Butterworth (MY); Marcos E. Carranza, Portland, OR (US); Ignacio Javier Alvarez Martinez, Portland, OR (US); Wei Seng Yeap, Penang (MY); Tung Lun Loo, Sungai Petani (MY)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 17/482,795

(22) Filed: Sep. 23, 2021

(65) Prior Publication Data

US 2022/0012490 A1 Jan. 13, 2022

(51) Int. Cl.
*G06V 20/00* (2022.01)
*G06T 7/70* (2017.01)
*G08B 21/18* (2006.01)
*G08B 21/22* (2006.01)
*H04N 7/18* (2006.01)

(52) U.S. Cl.
CPC ............... *G06V 20/00* (2022.01); *G06T 7/70* (2017.01); *G08B 21/182* (2013.01); *G08B 21/22* (2013.01); *H04N 7/185* (2013.01); *H04N 7/188* (2013.01)

(58) Field of Classification Search
CPC .......... G06V 20/00; G06V 20/59; G06T 7/70; G08B 21/182; G08B 21/22; G08B 21/0261; G08B 21/24; G08B 13/194; G08B 13/196; G08B 13/19641; H04N 7/185; H04N 7/188; H04N 7/183; H04N 23/65; H04N 23/651

See application file for complete search history.

(56) References Cited

U.S. PATENT DOCUMENTS

| | | | |
|---|---|---|---|
| 8,810,392 B1 * | 8/2014 | Teller | G08B 21/24 |
| | | | 340/572.1 |
| 10,964,197 B2 | 3/2021 | Krejcarek | |

(Continued)

FOREIGN PATENT DOCUMENTS

| | | | |
|---|---|---|---|
| CN | 115861978 | 3/2023 | |
| WO | WO-2020075045 A1 * | 4/2020 | ............ A62B 18/04 |
| WO | 2020178926 | 9/2020 | |

OTHER PUBLICATIONS

"European Application Serial No. 22191759.4, Extended European Search Report mailed Jan. 9, 2023", 7 pgs.

(Continued)

*Primary Examiner* — Vu Le
*Assistant Examiner* — Rachel Anne Ometz
(74) *Attorney, Agent, or Firm* — Schwegman Lundberg & Woessner, P.A.

(57) ABSTRACT

System and techniques for abandoned object detection are described herein. a fence is established about a person and an object is detected within the fence. An entry is created in an object-person relationship data structure to establish a relationship between the person and the object within the fence. Then, the position of the object is monitored until an indication that the fence is terminated is received. If it is detected that the object is outside the fence during the monitoring, the person is alerted.

24 Claims, 13 Drawing Sheets

(56) References Cited

U.S. PATENT DOCUMENTS

| | | | |
|---|---|---|---|
| 2013/0195204 A1* | 8/2013 | Reznik | H04N 21/2343 |
| | | | 375/240.26 |
| 2017/0098364 A1* | 4/2017 | Jaegal | B60Q 9/00 |
| 2017/0353829 A1 | 12/2017 | Kumar et al. | |
| 2019/0110019 A1* | 4/2019 | Jin | H04N 1/00 |
| 2021/0327249 A1* | 10/2021 | Levin | G08B 21/0225 |
| 2022/0277162 A1* | 9/2022 | Putterman | G06V 40/173 |

OTHER PUBLICATIONS

"European Application Serial No. 22191759.4, Response filed Sep. 5, 2023 to Extended European Search Report mailed Jan. 9, 2023", 20 pgs.

\* cited by examiner

ABANDONED OBJECT DETECTION

TECHNICAL FIELD

Embodiments described herein generally relate to computer object detection and more specifically to abandoned object detection.

BACKGROUND

Computer object detection encompasses a number of techniques in which sensor readings are used to identify physical objects in an environment. Sensors can include cameras (e.g., visual light cameras, infrared cameras, depth cameras, etc.), microphones, RADAR, LIDAR, ultrasonic sensors among others. Sensor readings alone generally do not provide object identification, but rather are processed to ascertain likely locations of an object and other characteristics that are used to identify the object.

Computer object detection is an underlying technology being used to enable autonomous vehicles or other assisted driving systems and vehicles. Generally, the computer object detection is combined to identify mobile and stationary objects in the environment of a vehicle, enable the vehicle to identify obstacles and navigate safely. Advances in autonomous and assisted vehicles have recently led to self-driving taxis or other conveyances that transport passengers without a human operator or attendant.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
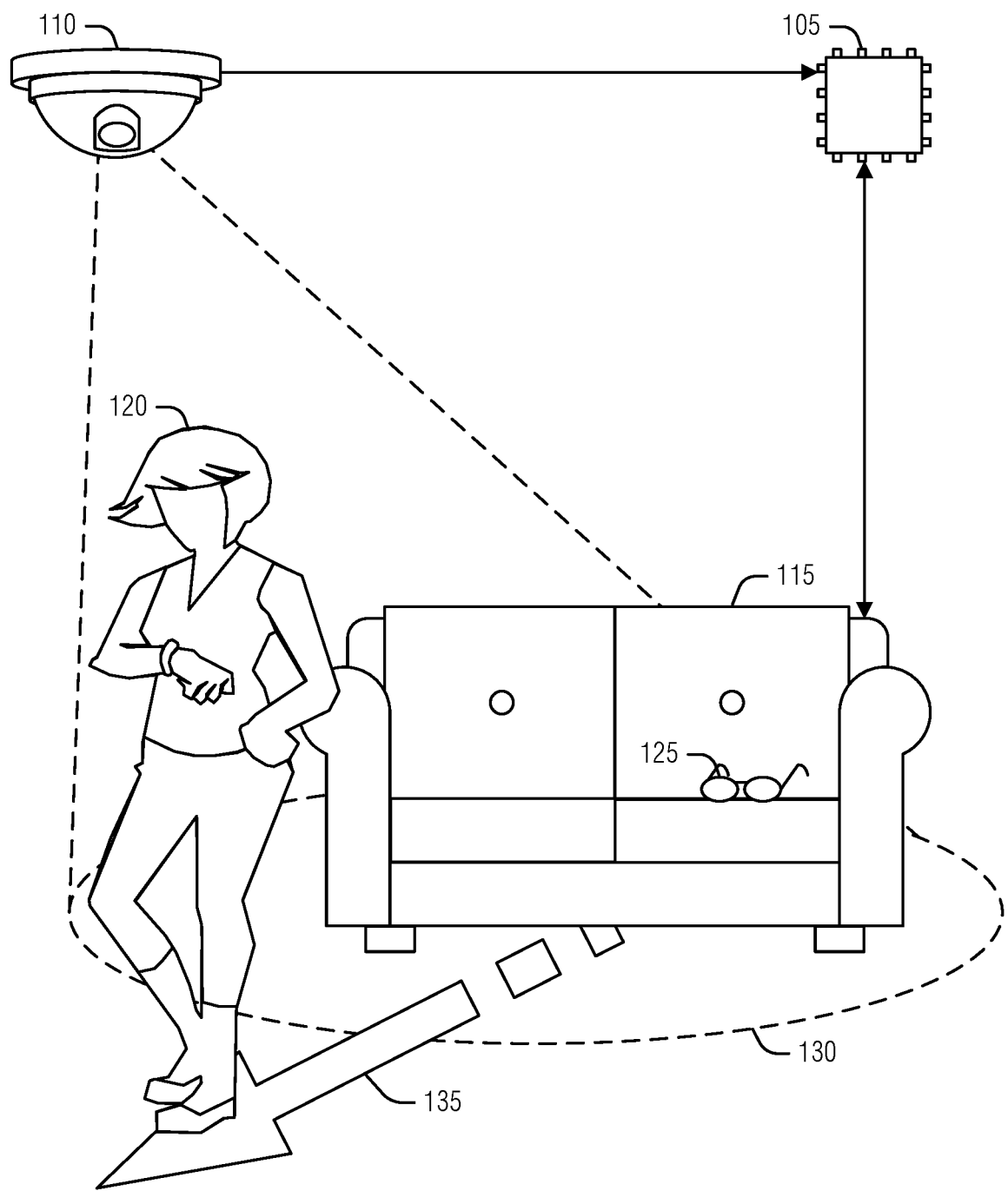
FIG. 1 is an example of an environment including a system for abandoned object detection, according to an embodiment.

Commuters lose belongings when using public transport. These belongings may include cellphones, wallets, keys, luggage, bags, clothing, or other items left in public transport such as taxis, robotaxis, buses, or trains. Causes for the loss may include forgetfulness, carelessness, accidentally dropping the items, or harsh traffic conditions (e.g., braking or swerving) that may cause the items to fall. In addition, autonomous delivery robots might lose cargo unnoticed.

Whenever a passenger loses their belongings, it is only natural that it causes concern to the individuals as their forgotten belongings in transport might be lost forever. The passenger could be losing expensive or sentimental items. Often, it may be too late by the time the passenger realizes that their belongings are gone in the transport.

A study in London has shown that 333,000 items were found on the Transport for the London network in the year 2018-2019. Over 3 million people use trains, tubes, buses, trams, and more in London daily. However, the study illustrates that 66% of these items are never claimed. The current London Public Transport process to reclaim lost items involves contacting passengers fill out a form and then forty or more staff members in the London Public Transport will try and match the completed form to items that are found and registered with their system. This is a lengthy process, and many items are never reclaimed. The majority of items are kept for three months, after which the items will then be donated, recycled, or disposed of.

A common technique to address lost items involves a passenger providing a mobile number with details of the items they have lost to the transportation company in the hope that, if the driver finds the item, the passenger could be contacted immediately. However, there is no guarantee that the belongings will ever be found and returned. It is possible that, even if the item was successfully located, not all drivers are willing to return them to the owner, or other passengers might have taken advantage of the situation and carried the item off as their own. Alternatively, it is also possible that a later passenger wishes to return the item but has no idea how to locate the owner.

Although object detection is becoming more prevalent in modern vehicles, there is currently no technique to match the detected object to its rightful owner. That is, a technique to establish unique object-person relationships is lacking. Although a car monitoring system may be able to detect and identify an object and its type, these systems do not associate the object with the passenger to which it belongs, making it difficult to return a lost item in a vehicle to its rightful owner.

To address this problem, other techniques have been employed. For example, an artificial intelligence-enabled system that uses technology (e.g., computer vision, machine learning, and natural language processing) to search a global database of images and descriptions to match the item found by airplane employees to match to a missing items report. This technique uses image recognition to identify unique details of the missing item, such as brand, material, color. Then, by recognizing similar words in the missing items report description, it can make a match quickly. However, this relies on accurate reporting by the passenger and any matching occurs well after the item is lost.

A mobile phone company has introduced a technique whereby sensors are used to locate the phone within a car. The technique uses sensors in the vehicle to triangulate the position of the missing phone, similar to how GPS does on a bigger scale. It also employs the phone's sensors to aid in the location detection, by tracking the movement of the phone if it moves around. Additionally, the system may use internal cameras to scan the car for unusual objects in the car as the first step to locating the lost phone. However, this technique relies on pre-knowledge of the phone and control of the vehicle, causing issues in public transportation.

A technique to identify and assess object value in one's own vehicle has been proposed. Specifically, valuable items left behind in a personally owned vehicle are detected and a warning is triggered if the item exceeds a certain monetary threshold. This application is mainly intended to prevent theft (e.g., of the item or the car) by notifying the user when an expensive item is left in their car. Here, a near-infrared (NIR) is used camera with a 190 degree field-of-view (FOV) lens that is mounted just above the rearview mirror, which provides a complete view of the front seats and an almost complete view of the rear seats. Items are detected by the camera and valued based on appearance. Training image generation techniques are used to produce a suitable synthetic dataset for object detection. Item price is used as an objective measure of value to help guide the detection process. Again, this technique is not conducive to public transportation environments because the relationship between the person and object is simply inferred by the person's ownership of the vehicle.

To address the issue of abandoned (e.g., left behind) items a technique to identify items and their owners in public spaces is described below. The technique operates by intelligently predicting and establishing a unique object-person relationship using computer vision and various sensors that are consolidated into a multimodal machine learning algorithm. The mechanism detects a disturbance in the object-person relationship and accurately predict whether passengers have left behind belongings in public transport, to proactively inform the passengers before even realizing the item was lost. The system may be applied to any mode of public transportation such as robotaxis, grab-cars, buses, trains, or even public spaces. In the case of delivery robots, the relationship comprises cargo items and the respective delivery robot losing these items, and detection of loss event could be realized by road side units (RSUs) or any other camera system e.g. traffic or location-based surveillance cameras. Additional examples and details are provided below.

FIG. 1 is an example of an environment including a system for abandoned object detection, according to an embodiment. The illustrated system includes processing circuitry 105 and a sensor array 110 covering an area 130. As illustrated, the person 120 was sitting in the public sofa 115 and placed her sunglasses 125 on the sofa 115. She then proceeded to move 135 outside of the area 130 leaving her sunglasses 125 behind. This provides an example framework to illustrate the operation of the system.

The processing circuitry 105 is configured to establish a fence about (e.g., around) the person 120. Here, "fence" is used to denote a boundary within which an item is designated as the person's and outside of which a detected object is not, akin to a geofence about a person. Thus, in general, fences are specific to people. Further, the fence moves with the person. Thus, in examples that follow, if an object is within a fence, the object may later be outside of the fence either because the object moved (e.g., and the person did not move), the person moved (e.g., and the object did not move), or both the person and the object moved. In an example, establishing the fence about the person includes registering the person at location, such as the public sofa 115, a transportation terminal, or in a vehicle. In an example, the registration is performed at a vehicle at the beginning of a ride that the person is taking in the vehicle. Thus, when getting into a robotaxi, for example, the person 120 registers that they are entering the robotaxi. In an example, the registration is for a specific seat within the location.

In an example, establishing the fence includes dividing up a physical space based on the number of people occupying the physical space. This example addresses a situation where multiple people occupy a single area (e.g., the backseat of a taxi). Generally, if the person 120 were the only person in the backseat, the fence could be the entire seat, as it is common for people to spread belongings out in a given space. However, if another occupant enters the taxi, then the two people will likely restrict themselves to their own sides of the seat. Accordingly, the fences adjust to divide a space given the occupants of the physical space. In an example, the division is equal. In an example, the division accounts for the size of the occupants, providing an extent around each. Here, bigger people will have fences that cover a larger area.

In an example, the fence is terminated when the person 120 leaves the area 130. Here, it is possible that the person 120 has forgotten her sunglasses when she leaves the area, providing a convenient time to be alerted to the mistake and retrieve the sunglasses 125. In an example, the fence is terminated when the ride completes. This example contemplates alerting the person 120 proactively about the items that has been placed in the vehicle and has migrated beyond the fence. For example, a phone placed on the seat may have fallen to the floor during a braking or swerving event. As the ride completes, the person 120 is notified that the object is on the floor to retrieve before leaving the vehicle.

In an example, the fence is one of several fences. Here, each fence of the several fences may corresponding to a class of objects. Object classifications may be used to account for varying levels of distance from the person 120 and the object (e.g., sunglasses 125) tolerated by people. For example, an animal (e.g., a pet) is often permitted its own space and may range farther than a phone. Conversely, an expensive watch may rarely be placed very far from the person 120 unless by mistake. The object classifications may address such factors as cost, convenience to replace (e.g., most food stuffs or snacks), and use patterns for the object to adjust how far away from the person 120 the fence extends.

The processing circuitry 105 is configured to detect the object (e.g., sunglasses) within sensor data provided by the sensor array 110 (e.g., received at an interface of the processing circuitry 105 to the sensor array 110). The processing circuitry 105 tracks the distance between the person 120 and the object. In an example, this tracking is performed by detecting the object within the fence. When the object is within the fence when detected, it is ascribed to the person 120.

In an example, the sensor array 110 includes a camera, RADAR, LIDAR, or ultrasonic sensors. In an example, detecting the object within the fence includes using the camera of the sensor array 110 to capture an image of the area 130. The processing circuitry 105 is configured to detect and classify the object from the image. In an example, the processing circuitry 105 is configured to measuring a distance between the person and the object. This distance may be used solely as the basis for determining whether or not the object belongs to the person 120. In this case, each object and person relationship may be considered a separate fence.

In an example, to detect that the object is outside of the fence, the processing circuitry 105 is configured to detect that an updated position between the person and the object exceeds a threshold based on the fence. Here, the fences may be the threshold, or the fence distance may be modified by an additional factor to arrive at the threshold. For example, the threshold may include a sensitivity factor that expands the fence. The sensitivity factor may address some things that are context dependent. Such as the person 120 putting a phone on the seat next to them and having it fall to the ground. If the object were trash, it would not be urgent to alert the person 120 during the ride. However, a phone, generally being more important to people, may warrant an alert when it first falls to the ground.

The processing circuitry 105 is configured to create an entry in an object-person relationship data structure to establish a relationship between the person 102 and the object within the fence. Here, the relationship is codified in the data structure establishing ownership of the object to the person 120 based on the initial proximity of the two when the object was detected. In an example, creating the entry in the object-person relationship data structure includes storing the distance between the person and the object. Generally, this distance is a physical distance (e.g., inches, centimeters, feet, etc.) but the distance may also be recorded in a consistent unit of measurement. Thus, for example, if the measurement is always performed from images produced by the same camera, the distance may be recorded in pixels from the image.

The processing circuitry 105 is configured to monitor positions of the object until an indication is received that the fence is terminated. Here, fence termination is an end condition at which point the monitoring ceases. Example of the end condition may be explicit (e.g., the person 120 ends a ride, the vehicle ends a ride, a stop is reached, etc.) or implicit (e.g., the person 120 leaves the area 130).

In an example, monitoring the object includes updating the entry in the object-person relationship data structure with an updated distance between the person and the object. Here, the monitoring continues to detect the object and adjust the fence based on movement of the person 120. The distance between the two is recorded, ultimately determining whether the object is within or without the fence. In an example, to perform the monitoring, the processing circuitry 105 is configured to repeatedly shut down the camera used to detect the object and employ at least one of an accelerometer, a motion sensor, or a pressure sensor in the area 130 to detect a change in state of an environment about the person 120. The processing circuitry 105 may then activate the camera to detect the object again and measure a distance between the person 120 and the object. This example illustrates a way to save power in power constrained environments, such as in robotaxis. Here, the camera is used to actually detect the object and perform distance measurements to the person 120. However, to save power, the camera is shut down. While the camera is not operating, lower power sensors are employed to detect state changes to the environment. For example, the accelerometer may detect a motion likely to provoke objects to slide or fall (e.g., a force in excess of 2Gs). A pressure sensor may be used to determine if the object has left a surface or been placed on a surface. Similarly, a motion sensor may simply note that things are moving within the area 130. Once the lower power sensor provides evidence that objects may have moved, the processing circuitry 105 reactivates the camera to detect the objects again and update the distance relationship in the object-person relationship data structure.

When the processing circuitry 105 detects that the object is outside of the fence, the processing circuitry 105 is configured to alert the person 120 that the object is outside of the fence. In an example, the alert includes providing a message to a mobile phone of the person 120. In an example, the alert includes actuating at least one of a visual, a haptic, or an auditory device proximate to the person. In these cases, a speaker, buzzer, or display is used to notify the user about the abandoned object. In an example, the actuator is placed within the area 103, such as in the sofa 115.

Using distance to establish relationships between the person 120 and objects is a flexible technique that conforms to usual behavior in public accommodation situations. Tracking this distance with respect to an acceptable extent (e.g., the fence) provides an efficient mechanism to determine when an object is likely to have been missed by the person 120. Alerting the person 120 of this changed condition enables the person 120 to react within the moment to retrieve the object and avoid the losses that generally plague people using public accommodations, such as trains, airplanes, terminals, robotaxis, etc.

Figure 2:
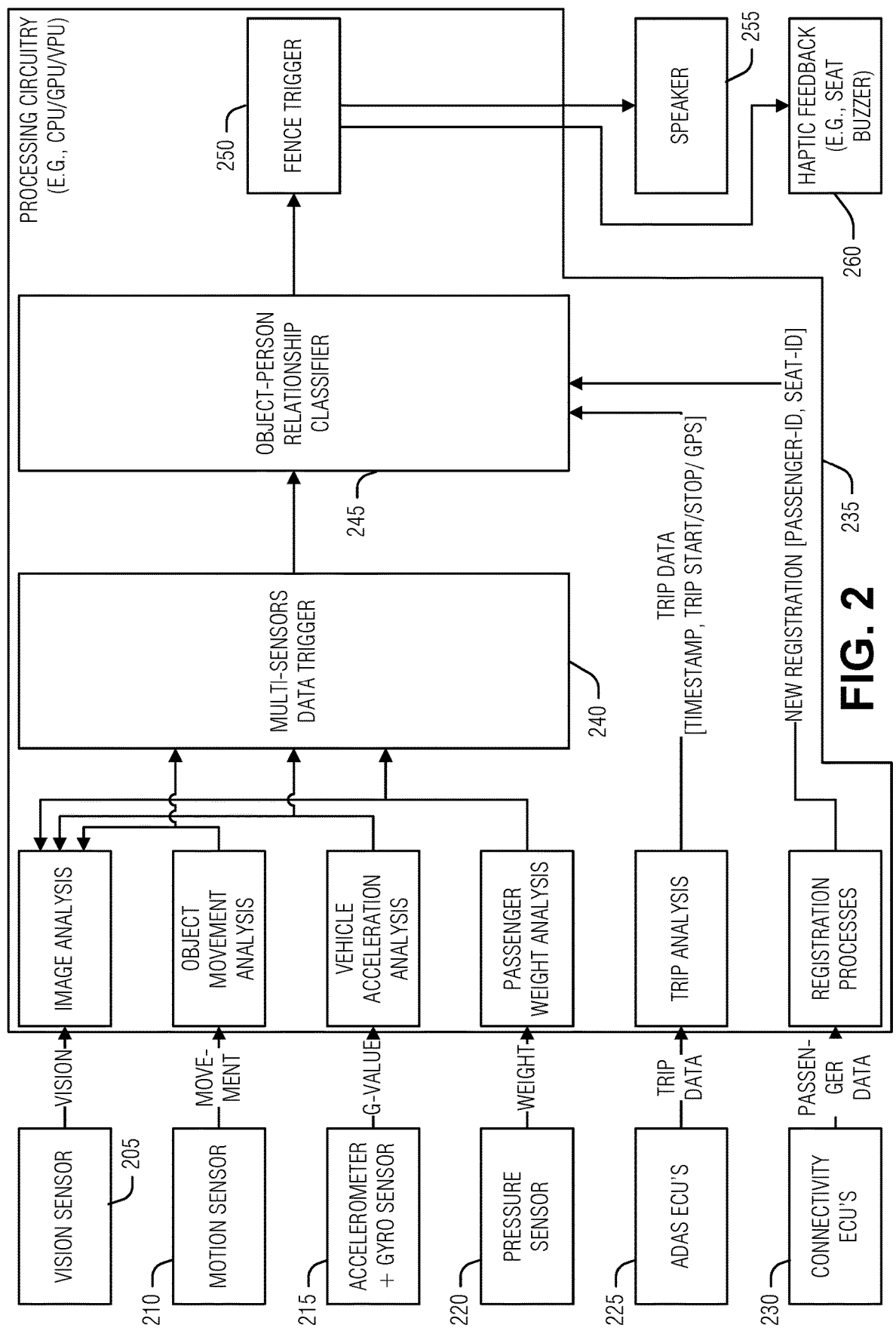
FIG. 2 is a block diagram of an example of a system for abandoned object detection, according to an embodiment.

FIG. 2 is a block diagram of an example of a system for abandoned object detection, according to an embodiment. As illustrated, a variety of sensors—such as a vision sensor 205 (e.g., a camera), a motion sensor 210 (e.g., ultrasonic detector), an accelerometer or gyroscopic sensor 215, a pressure sensor 220—may be communicatively connected to processing circuitry 235 to provide data for analysis of the environment. The processing circuitry 235 may also be communicatively coupled to vehicle computers, such as the advanced driver-assistance system (ADAS) electronic control unit (ECU) 225 or connectivity ECU 230 to enable trip data or communication with a mobile phone of the person.

The processing circuitry 235 is configured to fuse the sensor data in a hardwired trigger 240 to determine when to activate the vision sensor 210 to perform object-person relationship classification using the object-person relationship classifier 245. The classifier 245 provides the relationship details (e.g., which objects are related to which people and distances between them) to the fence trigger circuitry 250, which applies the fence definitions to the relationships. When an object falls outside of the fence, the fence trigger circuitry 250 is configured to a speaker 255 or haptic feedback 260 to alert the person.

The vision sensors 205 contribute to image recognition analysis and may be used to identify the passenger, objects, and its surrounding. Vision sensors 205 may include visible light cameras, depth cameras (e.g., stereo cameras, time-of-flight depth cameras, etc.), infrared cameras, etc.

Motion sensors 210 may be used for object movement analysis, detecting when an object moves, such as objects falling onto the floor or objects moving away from the passenger. Examples of motion sensors 210 may include ultrasonic sensors, infrared sensors, radar, a multi-array microphone, etc. Motion sensors may be particularly useful when dealing with objects that fall into a blind spot of the passenger or vision sensors. For example, the object slipping in between the seats or falling underneath the seat.

Pressure sensors 220 may be used to analyze passenger body movement and detect when the passenger sits down, stands up, leans to a side, or has any sudden movements. An example of such sensors 220 may include seating posture monitoring sensors. Such sensing is useful when recognizing passenger movements throughout the journey using weight on seats. Whenever the passenger has any movements, there is a potential risk that some belongings slipping out of a pocket, falling from a lap, or otherwise moving unexpectedly.

The accelerometer or gyroscope 215 may be used to analyze vehicle movement and used to detect vehicle speed and motion. This may be useful when the vehicle to traversing dynamic conditions—such as moving through a storm, on bumpy roads, etc.—likely to cause objects or people within the vehicle to shift. For example, if the vehicle makes a sharp turn or sudden halt, it is likely that objects shift or fall in the vehicle.

The ADAS ECU 225 contributes to trip data analysis and may be used to detect start and stop times for a trip, provide positioning—such as global position system (GPS), Galileo, or global navigation satellite system (GLONASS)—to determine the location and travel route of a journey. The ADAS ECU 225 may also provide a variety of timestamps, such as when the vehicle is halted for a long time before resuming the journey. This data is useful when details for a passenger's journey help to establish a relationship between objects and people. For example, the passenger is going through a route that has a lot of construction work, certain timestamps—such as start times—and GPS may be used to estimate the high-risk areas.

Connectivity ECU's 230 may contribute to passenger data analysis and used to detect the passenger details during a registration process. This may be used to assign a passenger_ID or seat ID. Such registration may also enable identification of the person for later contact in cases where an object is lost. In an example, it is useful to set a unique seating position to each passenger and acknowledge when each seat that is booked or assigned to them. With this data, the passenger_ID may be used as the base key for the object-person relationship data structure. Additionally, the Connectivity ECU 230 may identify which seat to perform sensory data analysis for a particular passenger or enable transmission of alerts to the passenger via the unique seat's actuators if necessary.

Figure 3:
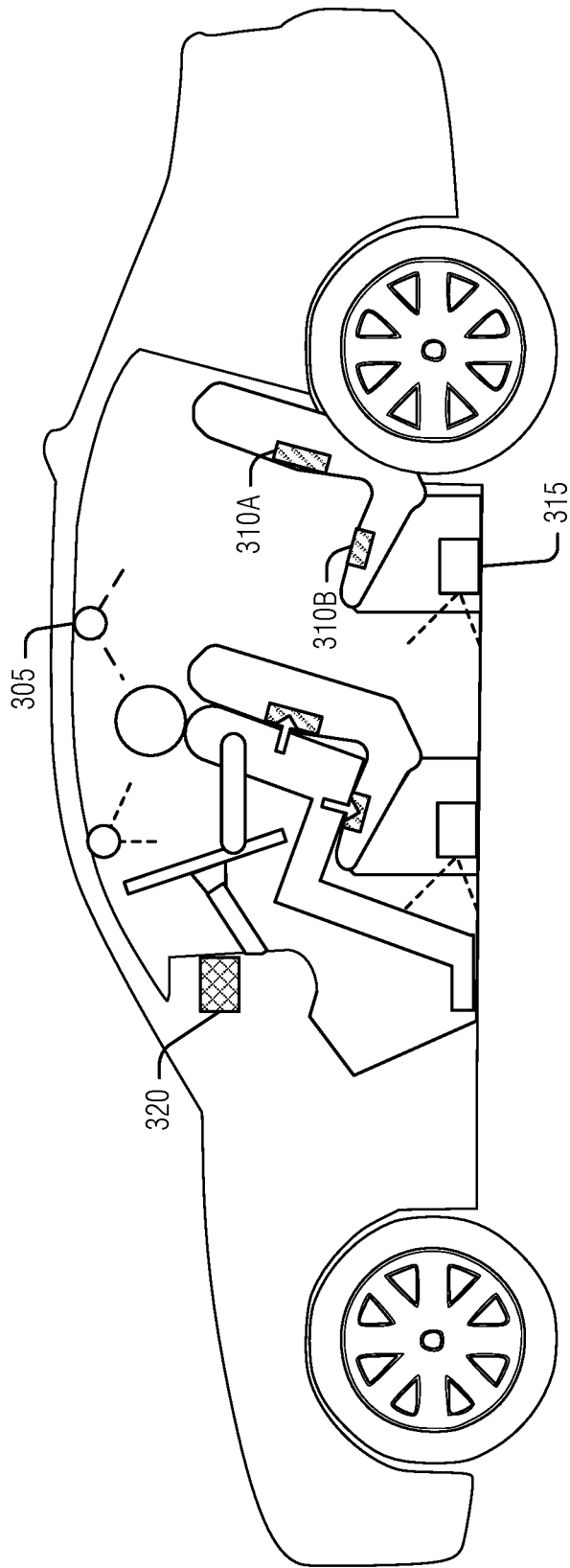
FIG. 3 illustrates an example of a sensor array in a vehicle, according to an embodiment.

FIG. 3 illustrates an example of a sensor array in a vehicle, according to an embodiment. Here, multiple sensors with different modes of operation are strategically placed throughout the vehicle. The sensors include vision (e.g., camera 305), motion (e.g., ultrasonic sensor 315), pressure (e.g., pressure sensors 310A and 310B), and accelerometer+ gyroscope (e.g., sensor 320 which may be included in an ECU of the vehicle).

Figure 4:
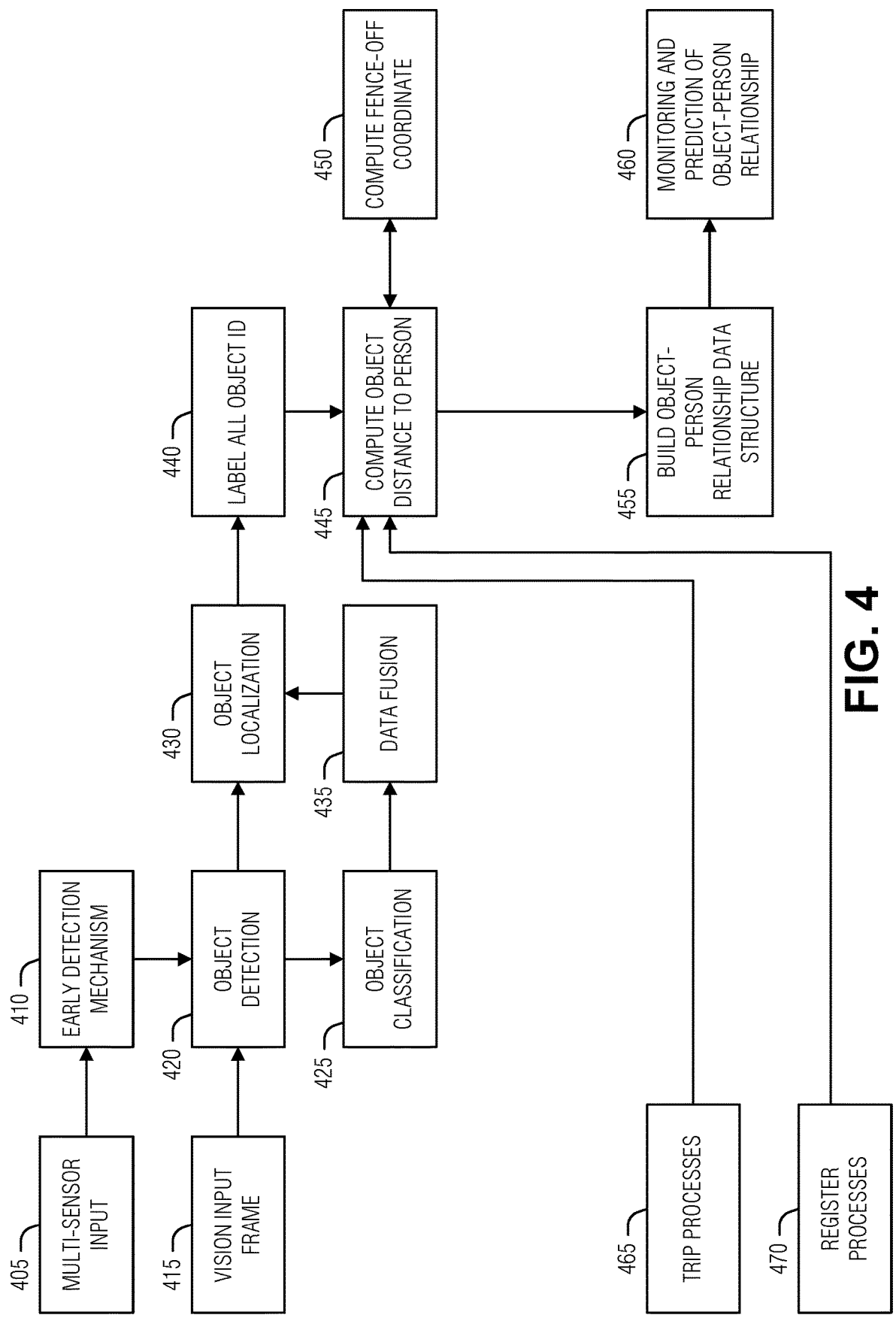
FIG. 4 illustrates an example of a technique to establish object-person relationships, according to an embodiment.

FIG. 4 illustrates an example of a technique to establish object-person relationships, according to an embodiment. The technique may be considered via three sub-portions: object preparation, data registration, and object-person relationship building.

An Object preparation sub-system may include components 405-435. Here, data from multiple sensor inputs 405—such as motion, pressure, or accelerometer and gyroscope sensors—are sent to early multi-sensor model data trigger circuitry 410 (e.g., detection circuitry). Whenever there is a change in the sensor's data that exceeds a defined threshold value, detection level trigger is issued. In this case, an interesting or significant behavior in these sensors is detected and fed down the line for further analysis in the multi-sensor model data trigger circuitry 410 for object detection 420 using vision sensor data 415. For example, a sudden spike in the accelerometer over a certain threshold may be flagged as high risk and be detected as a significant sensory input change.

The vision input frame 415 is used for object detection 410 and classification 425, the outputs of which may be used for data fusion 435 and ultimately object localization within the environment. As noted elsewhere, the vision input frames may be sporadic to save power. Thus, a camera may periodically capture video frames with predefined interval time. Further, the camera may be triggered by the early detection circuitry 410 to performing intelligent enablement of the object detection circuitry 420.

The data registration sub-system includes components 465 and 470. These components ensure capture of information as vehicle trip details—such as Trip-Status, GPS, or vehicle_ID—and passenger details—such as passenger_ID. This data may be extracted from an ADAS ECUs or Connectivity ECUs of a vehicle. With the information obtained from both the passenger and vehicle ADAS, additional details about the passenger may be used to establish object-person relationships.

The object-person building subsystem includes components 440-460. This subsystem uses the data from the object preparation and data registration sub-systems to build a detailed object-person relationship data structure. In operation, the subsystem labels object-IDs 440. Based on the sensor data (e.g., object detection 420, classification 425, or localization 430) a relationship is established between objects and a passenger. Each object is assigned a unique object_ID.

A distance is computed between the object and the person 445. Thus, after collecting the detailed data from the ECU's and assigning each object with an object_ID, every object's distance to the passenger is calculated, for example, by using existing floor to plans of the vehicle.

Fence-off coordinates are computed 450 with details of the passenger_ID and each object's distance (e.g., (x,y,z) or (x,y)) data based on the passenger's geo-location and surrounding environment. This process constantly monitors the passenger and detects movement of the passenger changing fence boundaries around the passenger.

The data structure of the object-person relationship is built 455 that defines all of the passenger's unique details with the object associated with them. The data structure may also include the objects' type, category, or each object's (x,y) position in relation to the person.

The potential object-person relationship is then monitored 460 to detect potential breakage of the relationship between the objects and the passenger based on the configured distance value. Thus, if the object assumed to be the persons moves too far away from the person (e.g., outside of the fence), the person may be alerted.

In establishing object-person relationships, a distance model may be used. Consider a generic graph data structure comprising edges and vertices. Here, relationships may be modeled as edges with person_IDs and object_IDs as vertices. The following pseudocode demonstrates an algorithm to establish object-person relationship that fuses distance data, by using a graph and a kNN classifier for nearest neighbor object classification.

Construction of weighted graph with object-person relationship data:

```
first snapshot when human gets into the vehicle:
run object detection + classification and Passenger_ID
for each object detected:
    register object id as object vertices list
    for each face detected:
        register face id as person vertices list
        if object list count > 1 and face list count > 1:
            for each object:
                run distance estimation between object and face
                construct adjacent list between object, face, distance data
```

-continued

---
Construction of weighted graph with object-person relationship data:

gyro, accelerometer, pressure sensor value is captured as reference.
first snapshot of relationship graph is completed.
--------------------------------------------------------------------------------
-------
while (gyro, accelerometer, pressure sensor) > reference:
   rerun object classification and Passenger_ID
   reconstruct new object and face relationship
   compare previous graph against new graph to detect missing object if any
     if multi face is detected and there's an object is in between:
       the face to object relationship is determined by k nearest neighbor (kNN) classifier

---

At the end of the for loop, a weighted graph is constructed with the following example code:

```
Vehicle_graph =
[
    (Passenger_1_id, object_1_id, distance between person_1 and object_1),
    (Passenger_1_id , object_2_id, distance between person_1 and object_2),
    (Passenger_1_id, object_3_id, distance between person_1 and object_3),
    (Passenger_2_id, object_4_id, distance between person_1 and object_4),
    (Passenger_2_id, object_5_id, distance between person_1 and object_5),
.]
```

The distance data above is an example of relationship data. Wearable objects—such as spectacles or watches—are generally are close to a person, whereas tools—such as cell phones—have a moderate distance to a person, and accessories—such as bags have a further distance to a person. Thus, the corresponding calculation may be referenced, as:

Relationship (R)=parameter measured/reference parameter

If R-value is more than 1, the reference parameter is violated.

The below example shows how distance is used as R data to detect object misplace scenarios:

---
Algorithm during passenger exit or sensor triggered event:

reference_distance = distance_estimation(left door, right door)
for each adjacent list in the graph:
   if (distance between a person id and an object_id) > reference_distance:
      notify person_id about object_id being left out

---

Figure 5:
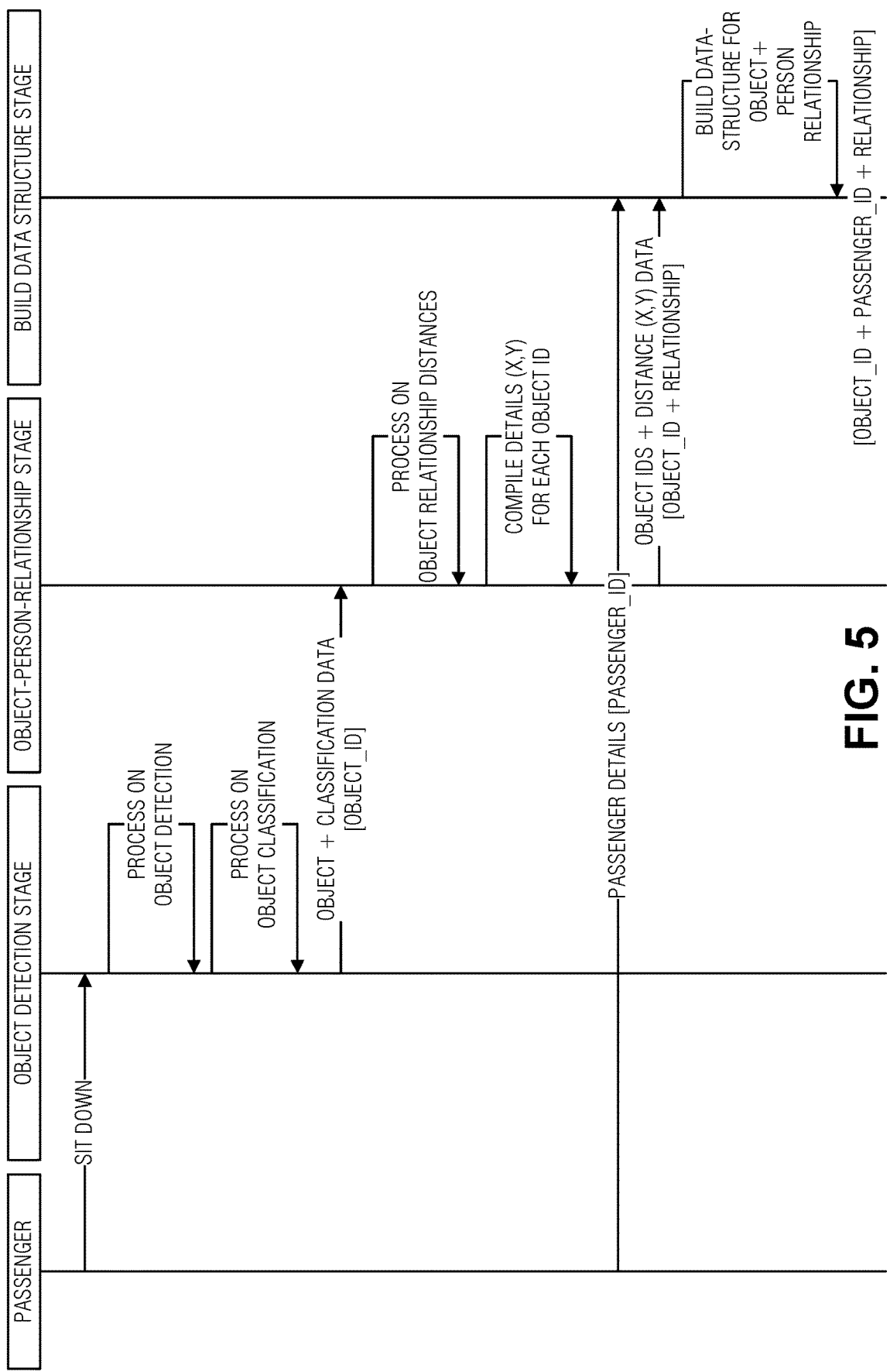
FIG. 5 illustrates example interactions between components when creating object-person relationships, according to an embodiment.

FIG. 5 illustrates example interactions between components when creating object-person relationships, according to an embodiment. When the passenger is seated, passenger details may be encapsulated into a [Passenger_ID]. In an object detection phase, once the passenger is identified, object detection and classification are performed. The results are encapsulated into each object_ID for the respective objects detected.

At the object-person relationship phase, the object's distance with the person is processed to form the relationship. Each object's distance details are used to define the object-person relationship. This gets further encapsulated data into [Object_ID+Relationship].

Now, the object-person relationship data structure entry is created that compiles each data point to create the final data encapsulation of [Object_ID+Passenger_ID+Relationship].

Figure 6:
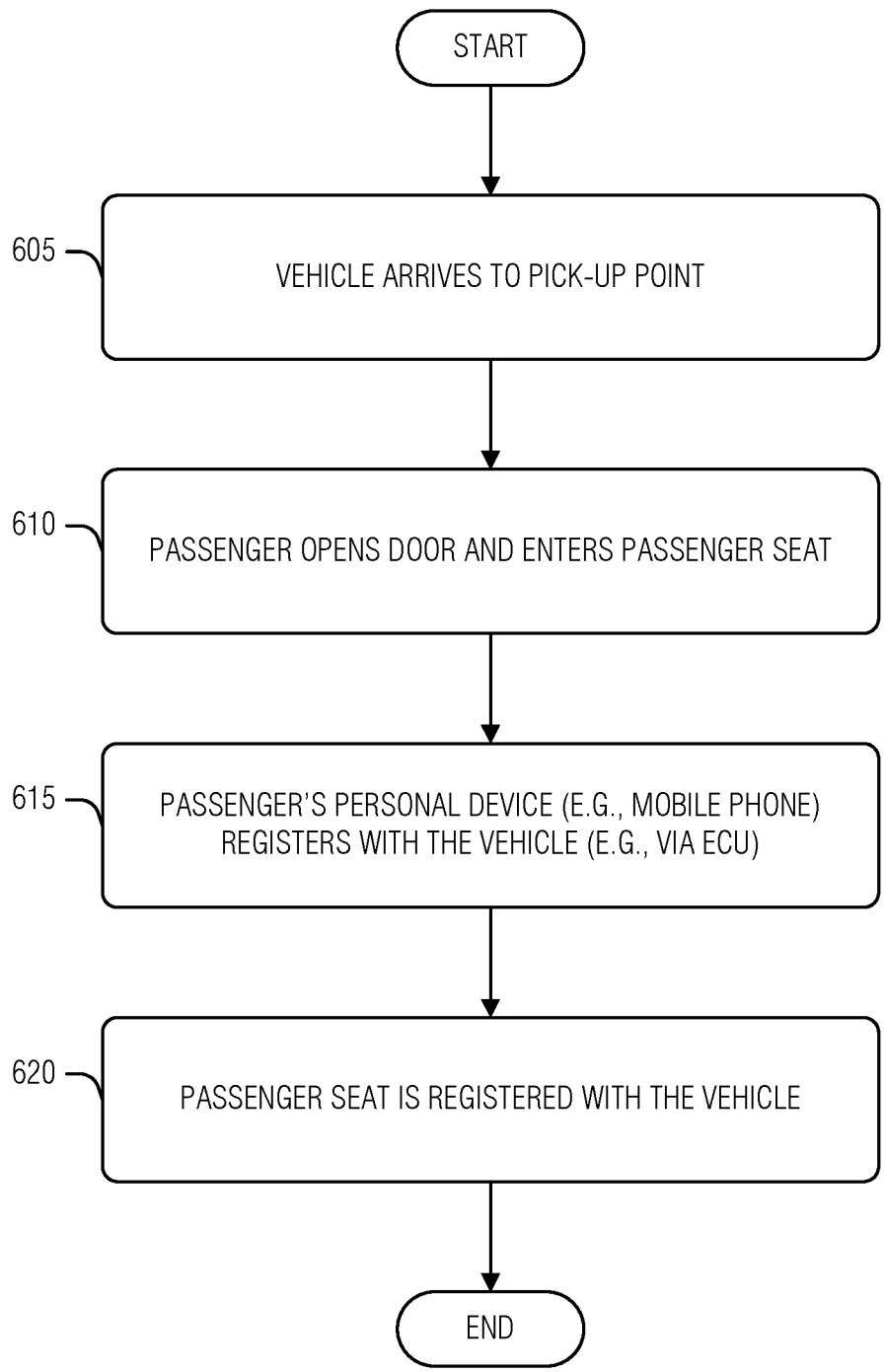
FIG. 6 illustrates an example of on-boarding a passenger, according to an embodiment.

FIG. 6 illustrates an example of on-boarding a passenger, according to an embodiment. The passenger on-boarding phase addresses what happens when the passenger first intends to take a vehicle or public transport to get to a destination. For example, a passenger wishes to travel from her house to the airport. She books a robotaxi with the help of the mobile app. When the vehicle arrives at the pick-up point (action 605), the passenger opens the door and sits (action 610). The passenger uses her mobile phone to register with the robotaxi through the connectivity ECU (action 615). The car seat that the passenger has chosen to sit in then registers with the car's-connectivity ECUs (action 620) once it detects that the passenger is seated (e.g., detected via pressure sensors). The trip-status and seat ID, once assigned, may be retrieved for use later from the ECU.

Figure 7:
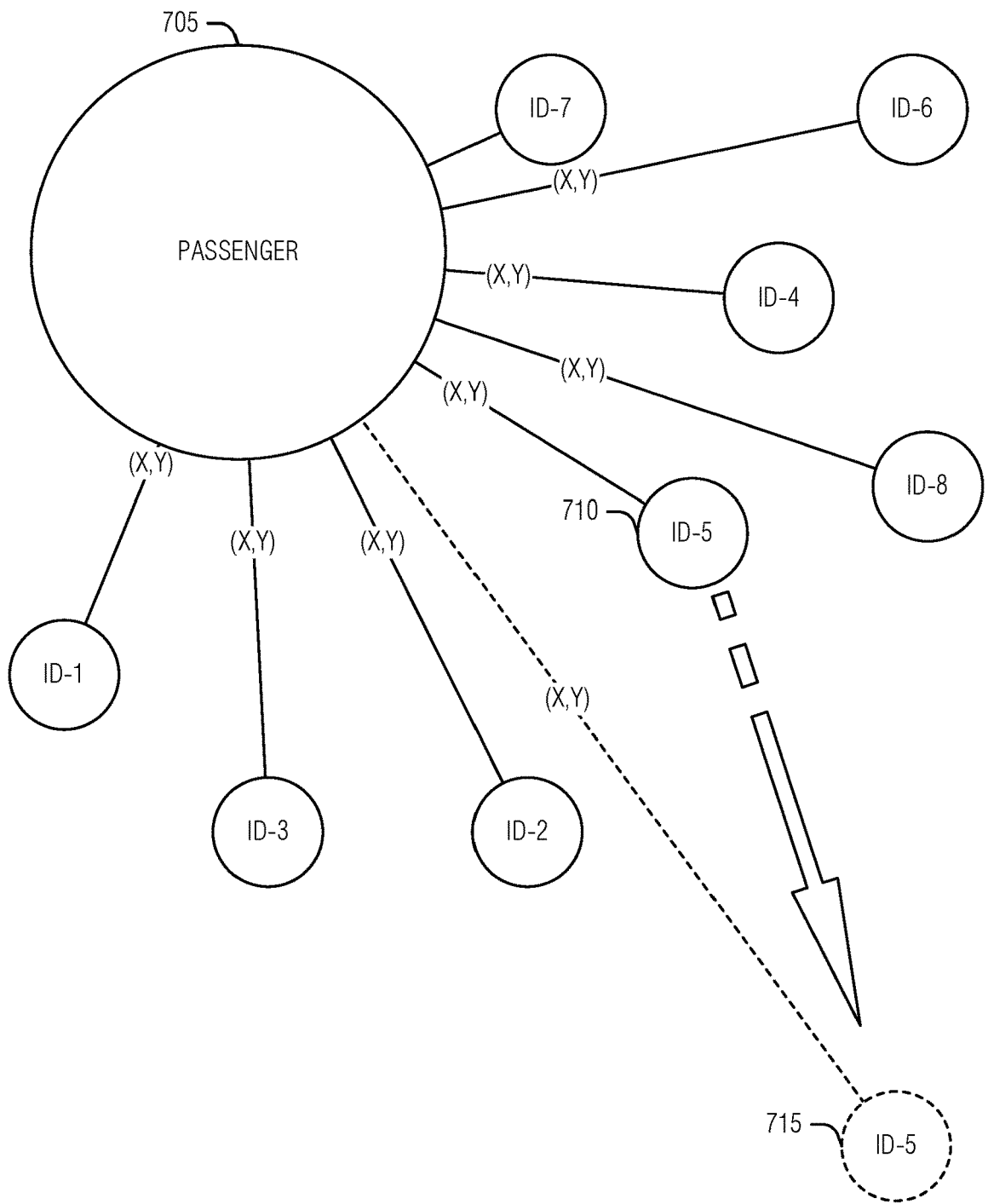
FIG. 7 illustrates an example of distance measurements between a passenger and objects to establish object-person relationships, according to an embodiment.

FIG. 7 illustrates an example of distance measurements between a passenger and objects to establish object-person relationships, according to an embodiment. As noted above, this is used to build the object-person relationships. As illustrated, the person 705 has a distance relationship to several objects with unique IDs, including object 710 associated with object_ID 5. The dashed line indicates the object 710 at a new position 715 at a later time (e.g., the object 710 is from an initial distance to a new distance from the person 705).

Object detection begins when the person 705 sits on a particular seat. This may be the first data set used to build as the initial version of the data structure. In an example, using a machine learning training data set, a variety of objects may be classified, such as a handbag, luggage, phone, ring, watch, sunglasses, hat, or pets among others. As illustrated, each of these objects is assigned a unique Object_ID.

After object detection and classification is complete and a passenger-ID is assigned, object-person relationships may be established. The distance between a particular object to the person 705 may be determined using image analysis and geo-positioning to determine the location of the person 705 and object respectively. Next, (x,y) data that represents object distance from the person 705 may be incorporated into each object_ID with the person 705. In an example, a map may be created with the different object_IDs and the person 705 including corresponding (x,y) distance data.

Monitoring is present throughout the person's journey. In an example, the motion and image sensors detect an object moving (e.g., object 710 moving to position 715) such as sunglasses falling off of luggage. This updated distance will modify the entry for the object 710 in the data structure.

Figure 8:
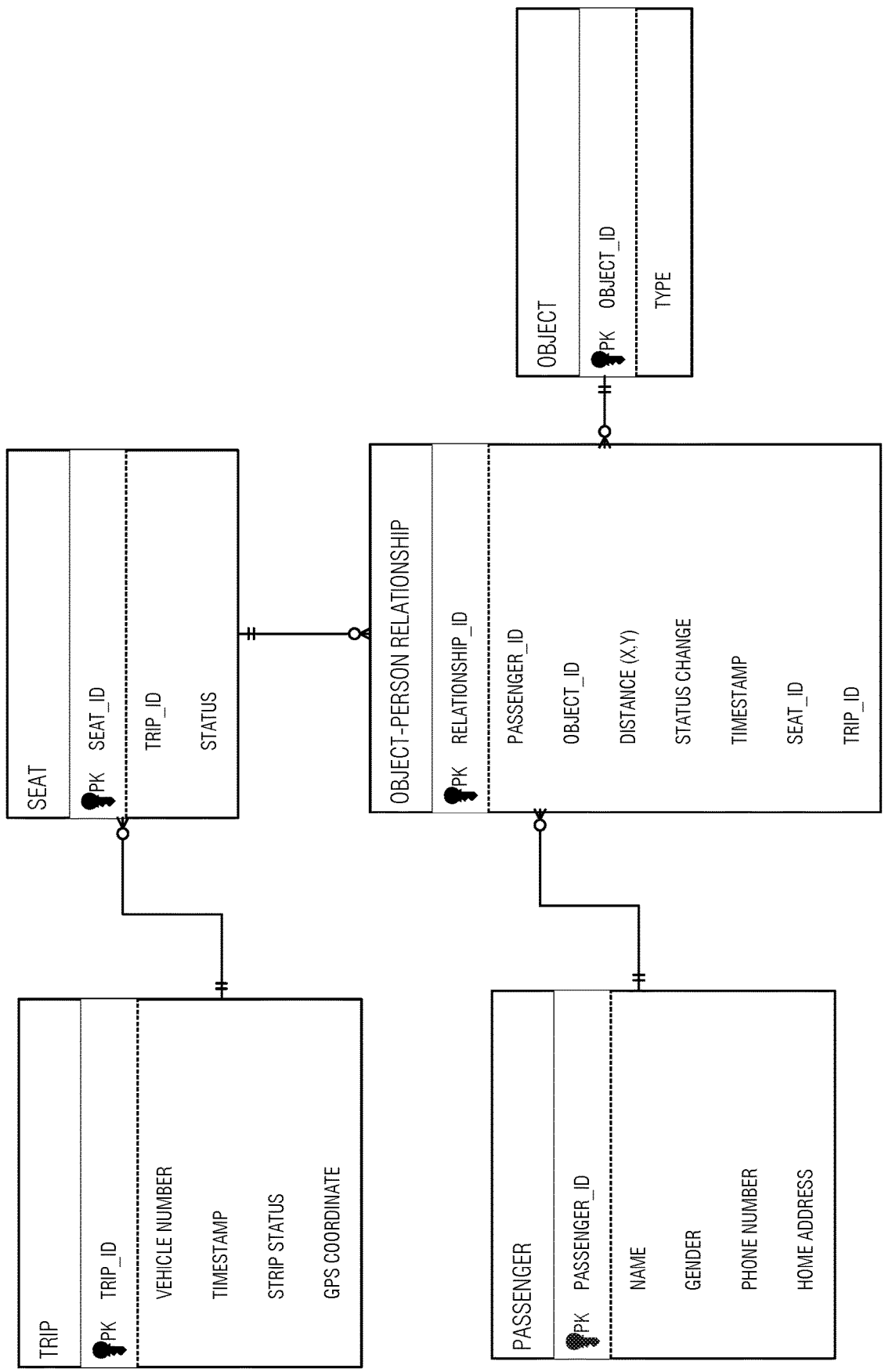
FIG. 8 illustrates entity relationships in a data structure for object-person relationships, according to an embodiment.

FIG. 8 illustrates entity relationships in a data structure for object-person relationships, according to an embodiment. Although the illustrated entity relationships are self-explaining, it is noted that the object-person relationship entity incorporates the passenger and objects (e.g., including object type or classification) and the distance between the objects and the person. As noted above, the initial data structure may be built upon the passenger's choice of a seat. Once an initial version of the data structure is created, updates to distances are recorded as well as possible status changes, such as the object falling outside of a pertinent fence.

Figure 9A:
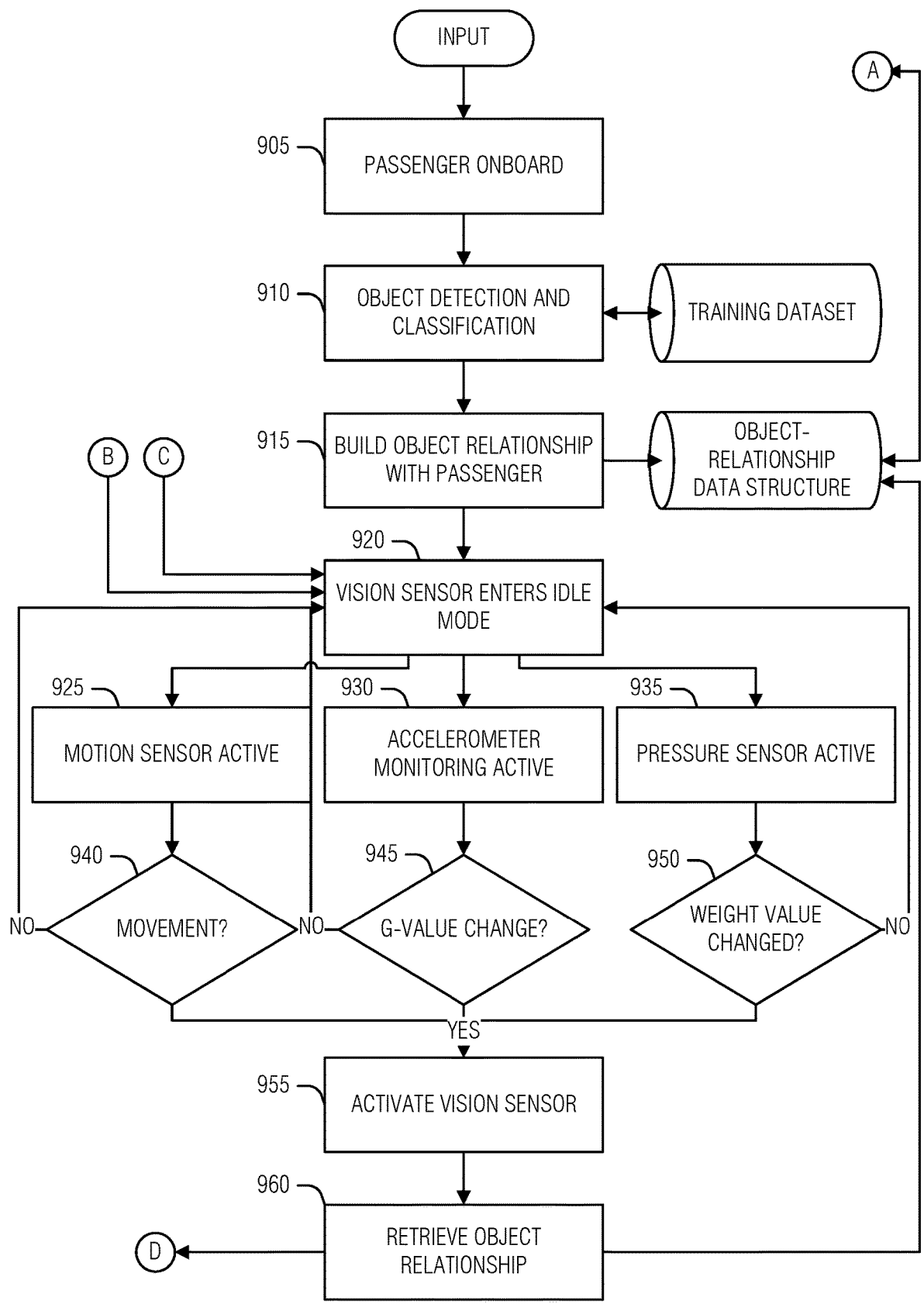
FIGS. 9A-9B illustrate an example technique to, according to an embodiment.
Figure 9B:
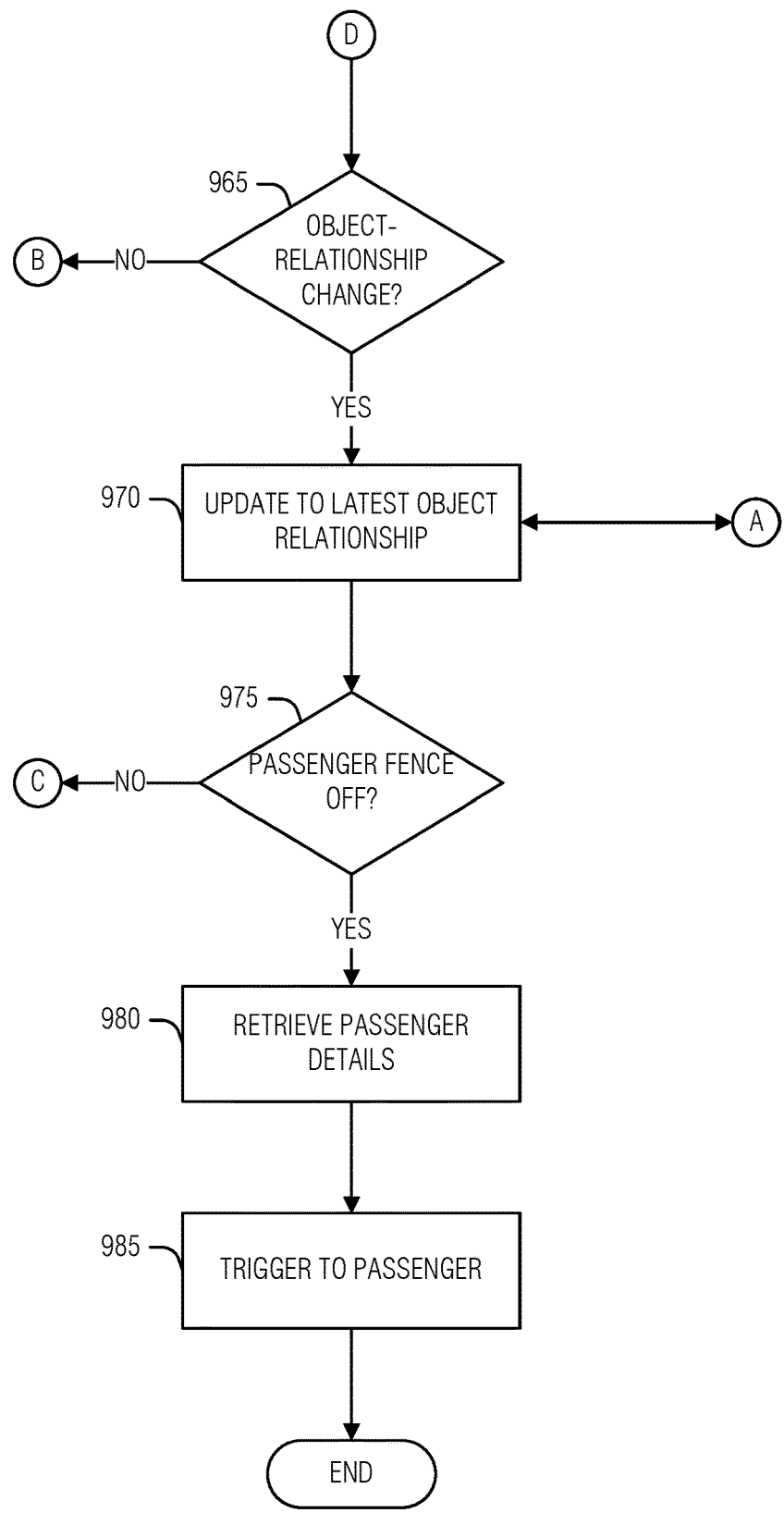

FIGS. 9A-9B illustrate an example technique to, according to an embodiment. FIGS. 9A-9B walks through a typical use case. At first, a passenger begins the onboarding process and enters the vehicle (e.g., car, bus, train, etc.) and sits in a specific place (operation 905). Object detection and classification (operation 910) follows. Each object identified is associated with the person seated in each specific place. The training dataset is used to accurately perform object identification and classification.

Next, the initial version of the object-person relationship is built with the passenger model (operation 915). All objects associated with the passenger are registered and stored in the object-person relationship data structure.

Once the initial version of the data structure is created, continuous monitoring is entered at operation 920. That is, continuous monitoring begins with an idle (e.g., deactivated, in low-power mode, etc.) vision sensor.

Non-vision sensors—such as motion, accelerometer+gyroscope, or pressure sensors—actively monitor the environment (operations 925, 930, or 935) for changes beyond a threshold. Once any of these sensors detect a change (decision 940, 945, or 950), the vision sensor is activated (operation 955 to capture image data. In an example, the vision sensor is periodically activated capture an image frame (e.g., every N seconds) to monitor the objects if no activity on the non-vision sensors has been detected for some time.

The initial object-person relationship data structure is then retrieved (operation 960). The new object-person relationship data is processed and compared to the initial version. If nothing has changed, the technique proceeds to the idle camera state 920. Otherwise, an update is triggered to update the latest relationship data into the object-person data structure (operation 970).

Monitoring of the status of the fence is also performed (decision 975). As long as the fence is on (or in effect), the process continues at the idle camera operation 920. When the passenger fence is off—e.g., as determined from a geofencing ratio given to the passenger with the aid of a vision sensor—the final object-person relationship version is extracted from the object-person relationship data structure along with the passenger details (operation 980). Then, an alerting event (e.g., alert) may be triggered. In an example, the alert uses actuators—such as speaker, buzzers, display, or text-to-speech notifications—to notify the passenger of the missing item. In an example, the alert includes the passenger's name or a list of the missing items.

Figure 10:
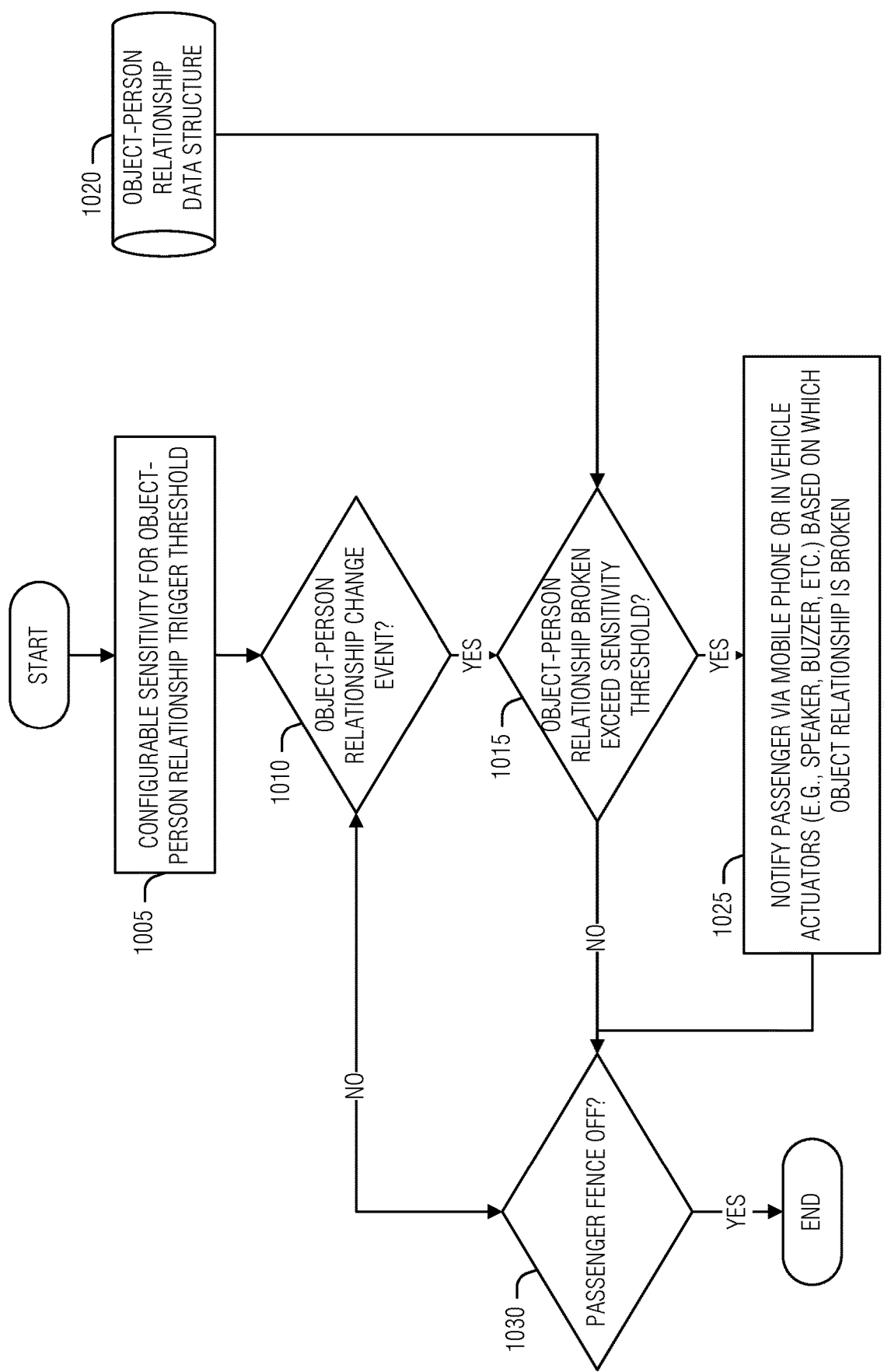
FIG. 10 illustrates a technique to notify a passenger of an abandoned object, according to an embodiment.

FIG. 10 illustrates a technique to notify a passenger of an abandoned object, according to an embodiment. This may also be called a passenger exit phase, such as when a passenger exits a vehicle or public area. In an example, geo-fencing mechanisms are used to detect when the passenger decides to leave the vehicle. As shown in FIG. 1 (area 130), a threshold may be defined to indicate whether the passenger is leaving or not. Such movement (e.g., move 135 from FIG. 1) may triggers the exit phase, resulting in retrieval of a final relationship status from the object-person relationship data structure The exits phase may include a configurable for sensitivity of each object (or type of object) in the object-person relationship (operation 1005). The sensitivity may inform a trigger threshold value for each assigned object. If a higher sensitivity threshold value is configured, then the object-person relationship becomes stricter. For example, a higher sensitivity value may be set for expensive belongings.

Continuous monitoring (decision 1010) is used to check on the object-person relationship. If there is no change, then the technique proceeds to decision 1030. Otherwise, the technique proceeds to decision 1015. At decision 1010, a process may wait on changes to be detected. In this case, the object-person relationship data structure provides detailed distance data to check on the sensitivity threshold for changes worth noting.

If the object-person relationship has changed, then followed by relationship sensitivity threshold is exceeded than the configured value, necessary measures are undertaken (operation 1025). If the relationship was not broken or exceeded the sensitivity threshold value, the monitor continues until the passenger turns to fence off (decision 1030).

If the object-person relationship breaks exceeding the threshold, the passenger may be notified (operation 1025) based on which object is broken via any of the vehicle's actuators. When the fence is off, monitoring ends.

Figure 11:
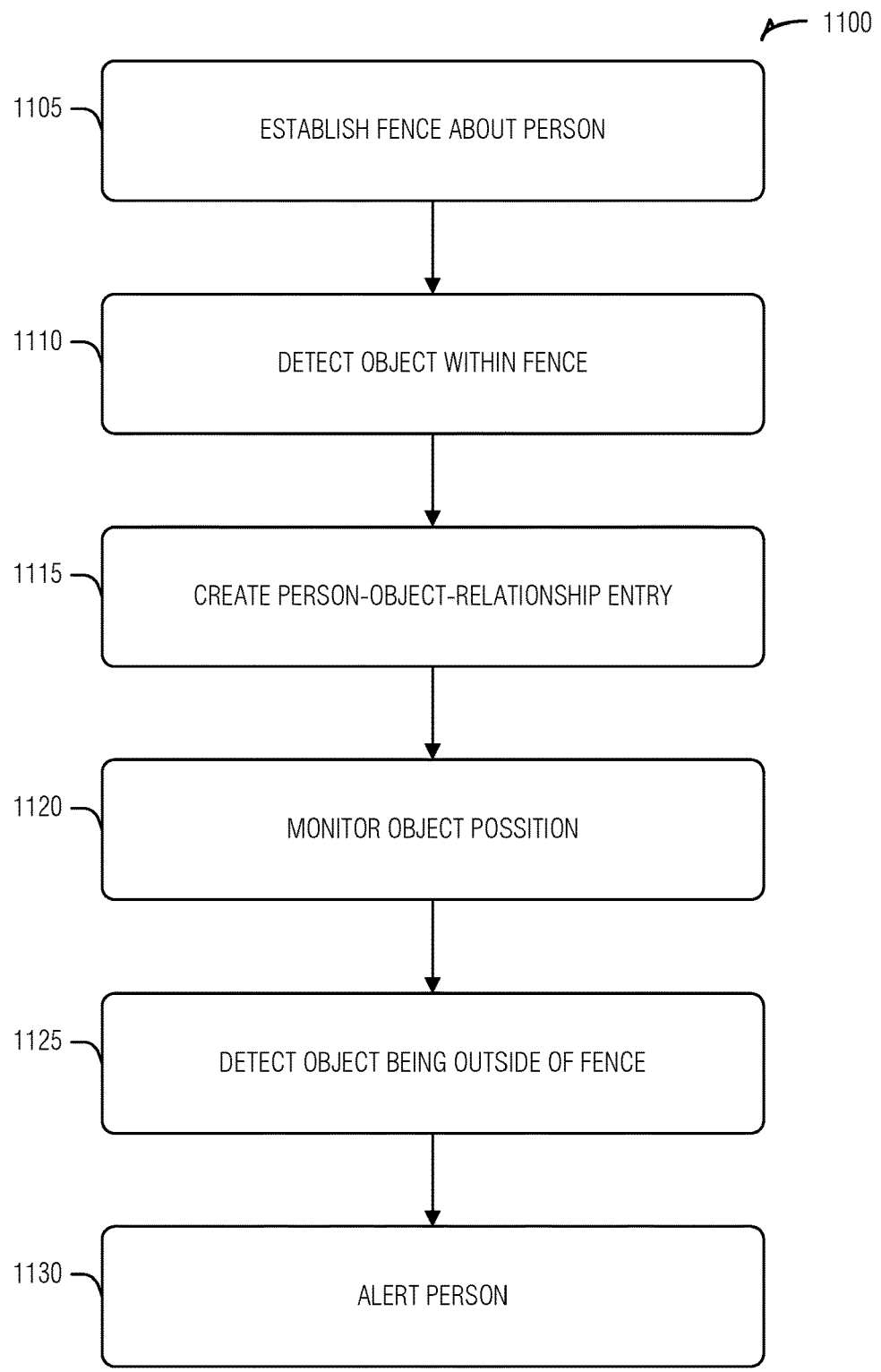
FIG. 11 illustrates a flow diagram of an example of a method for abandoned object detection, according to an embodiment.

FIG. 11 illustrates a flow diagram of an example of a method 1100 for abandoned object detection, according to an embodiment. The method 1100 is implemented in computer hardware, such as that described above or below (e.g., processing circuitry).

At operation 1105, a fence is established about (e.g., around) a person. In an example, establishing the fence about the person includes registering the person at a vehicle at the beginning of a ride that the person is taking in the vehicle. In an example, the fence is terminated when the ride completes. In an example, establishing the fence about the person includes dividing up a physical space based on the number of people occupying the physical space.

In an example, the fence is one of several fences, each fence corresponding to a class of objects, the object being in one class of the class of objects.

At operation 1110, an object within the fence is detected. In an example, detecting the object within the fence includes using a camera to detect and classify the object. In an example, detecting the object includes measuring a distance between the person and the object.

In an example, detecting that the object is outside of the fence includes detecting that an updated position between the person and the object exceeds a threshold based on the fence. In an example, the threshold includes a sensitivity factor that expands the fence.

At operation 1115, an entry in an object-person relationship data structure is created to establish a relationship between the person and the object within the fence. In an example, creating the entry in the object-person relationship data structure includes storing the distance between the person and the object.

At operation 1120, a position of the object is monitored until an indication is received that the fence is terminated. In an example, monitoring the object includes updating the entry in the object-person relationship data structure with an updated distance between the person and the object.

In an example, monitoring the position of the object includes repeatedly: shutting down the camera used to detect the object; using at least one of an accelerometer, a motion sensor, or a pressure sensor to detect a change in state of an environment about the person; and activating the camera to detect the object again and measure a distance between the person and the object.

At operation 1125, based on the monitoring of operation 1120, a detection is made that the object is outside of the fence.

At operation 1130, the person is alerted that the object is outside of the fence. In an example, alerting the person includes providing a message to a mobile phone of the person. In an example, alerting the person includes actuating at least one of a visual, a haptic, or an auditory device proximate to the person.

Figure 12:
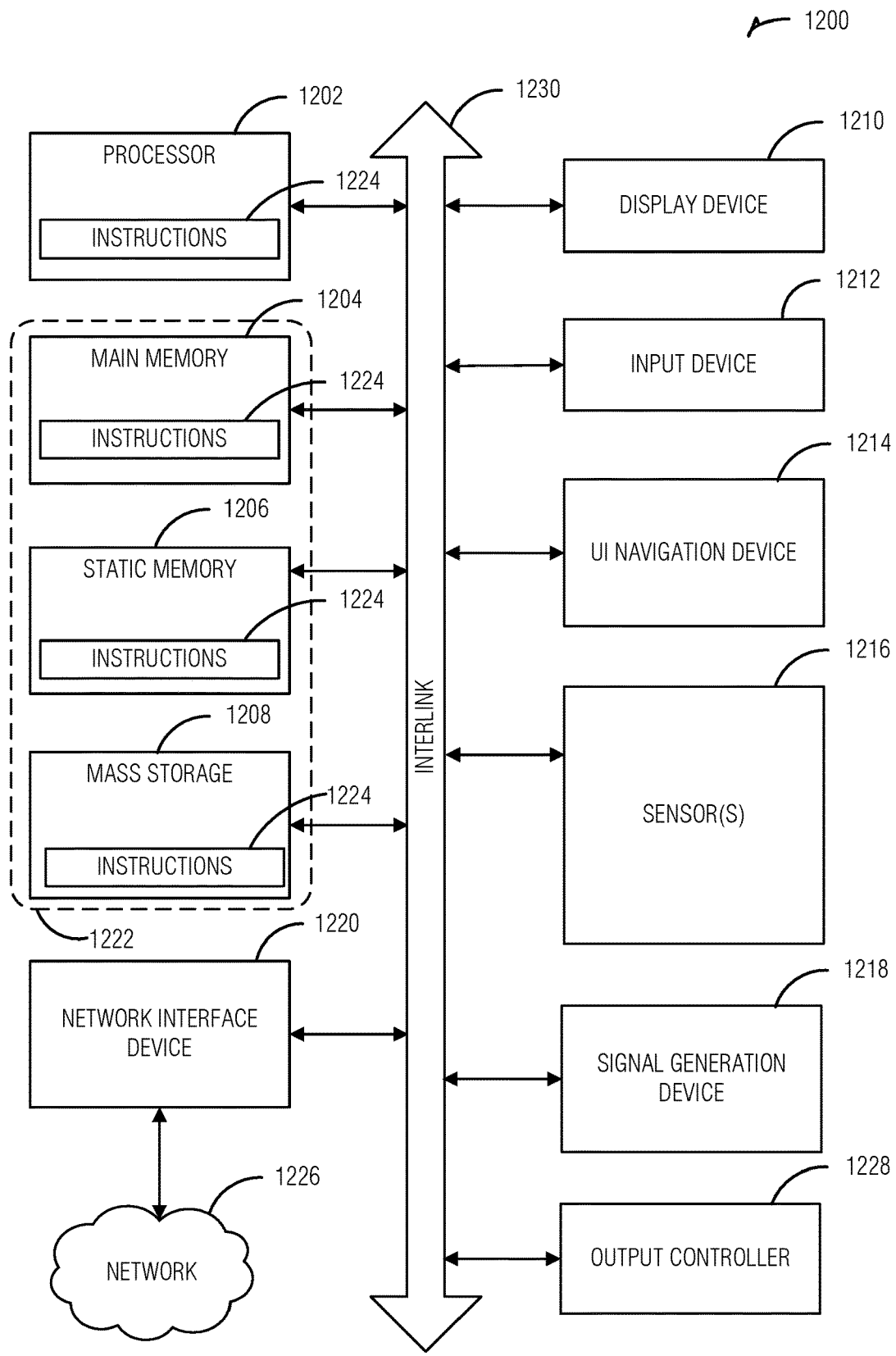
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may perform. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drives, tape drives, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1222 may be representative of the instructions 1224, such as instructions 1224 themselves or a format from which the instructions 1224 may be derived. This format from which the instructions 1224 may be derived may include source code, encoded instructions (e.g., in compressed or encrypted form), packaged instructions (e.g., split into multiple packages), or the like. The information representative of the instructions 1224 in the machine readable medium 1222 may be processed by processing circuitry into the instructions to implement any of the operations discussed herein. For example, deriving the instructions 1224 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1224.

In an example, the derivation of the instructions 1224 may include assembly, compilation, or interpretation of the information (e.g., by the processing circuitry) to create the instructions 1224 from some intermediate or preprocessed format provided by the machine readable medium 1222. The information, when provided in multiple parts, may be combined, unpacked, and modified to create the instructions 1224. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

ADDITIONAL NOTES & EXAMPLES

Example 1 is a device for abandoned object detection, the device comprising: an interface to a sensor, the interface arranged to collect sensor data; a memory including instructions; and processing circuitry that, when in operation, is configured by the instructions to: establish a fence about a person; detect, from the sensor data, an object within the fence; create an entry in an object-person relationship data structure to establish a relationship between the person and the object within the fence; monitor a position of the object until an indication is received that the fence is terminated; detect, from the monitoring, that the object is outside of the fence; and alert the person that the object is outside of the fence.

In Example 2, the subject matter of Example 1, wherein, to establish the fence about the person, the processing circuitry registers the person at a vehicle at a beginning of a ride that the person is taking in the vehicle.

In Example 3, the subject matter of Example 2, wherein the fence is terminated when the ride completes.

In Example 4, the subject matter of any of Examples 1-3, wherein, to establish the fence about the person, the processing circuitry divides up a physical space based on a number of people occupying the physical space.

In Example 5, the subject matter of any of Examples 1-4, wherein the sensor includes a camera, and wherein, to detect the object within the fence, the processing circuitry uses sensor data from the camera to detect and classify the object.

In Example 6, the subject matter of Example 5, wherein, to detect the object, the processing circuitry measures a distance between the person and the object.

In Example 7, the subject matter of Example 6, wherein, to create the entry in the object-person relationship data structure, the processing circuitry stores the distance between the person and the object.

In Example 8, the subject matter of Example 7, wherein, to monitor the object, the processing circuitry updates the entry in the object-person relationship data structure with an updated distance between the person and the object.

In Example 9, the subject matter of any of Examples 6-8, wherein, to detect that the object is outside of the fence, the processing circuitry detects that an updated position between the person and the object exceeds a threshold based on the fence.

In Example 10, the subject matter of Example 9, wherein the threshold includes a sensitivity factor that expands the fence.

In Example 11, the subject matter of any of Examples 5-10, wherein, to monitor the position of the object, the processing circuitry repeatedly: shuts down the camera used to detect the object; uses at least one of an accelerometer, a motion sensor, or a pressure sensor to detect a change in state of an environment about the person; and activates the camera to detect the object again and measure a distance between the person and the object.

In Example 12, the subject matter of any of Examples 1-11, wherein, to the person, the processing circuitry provides a message to a mobile phone of the person.

In Example 13, the subject matter of any of Examples 1-12, wherein, to alert the person, the processing circuitry actuates at least one of a visual, a haptic, or an auditory device proximate to the person.

In Example 14, the subject matter of any of Examples 1-13, wherein the fence is one of several fences, each fence corresponding to a class of objects, the object being in one class of the class of objects.

Example 15 is a method for abandoned object detection, the method comprising: establishing a fence about a person; detecting an object within the fence; creating an entry in an object-person relationship data structure to establish a relationship between the person and the object within the fence; monitoring a position of the object until an indication is received that the fence is terminated; detecting, from the monitoring, that the object is outside of the fence; and alerting the person that the object is outside of the fence.

In Example 16, the subject matter of Example 15, wherein establishing the fence about the person includes registering the person at a vehicle at a beginning of a ride that the person is taking in the vehicle.

In Example 17, the subject matter of Example 16, wherein the fence is terminated when the ride completes.

In Example 18, the subject matter of any of Examples 15-17, wherein establishing the fence about the person includes dividing up a physical space based on a number of people occupying the physical space.

In Example 19, the subject matter of any of Examples 15-18, wherein detecting the object within the fence includes using a camera to detect and classify the object.

In Example 20, the subject matter of Example 19, wherein detecting the object includes measuring a distance between the person and the object.

In Example 21, the subject matter of Example 20, wherein creating the entry in the object-person relationship data structure includes storing the distance between the person and the object.

In Example 22, the subject matter of Example 21, wherein monitoring the object includes updating the entry in the object-person relationship data structure with an updated distance between the person and the object.

In Example 23, the subject matter of any of Examples 20-22, wherein detecting that the object is outside of the fence includes detecting that an updated position between the person and the object exceeds a threshold based on the fence.

In Example 24, the subject matter of Example 23, wherein the threshold includes a sensitivity factor that expands the fence.

In Example 25, the subject matter of any of Examples 19-24, wherein monitoring the position of the object includes repeatedly: shutting down the camera used to detect the object; using at least one of an accelerometer, a motion sensor, or a pressure sensor to detect a change in state of an environment about the person; and activating the camera to detect the object again and measure a distance between the person and the object.

In Example 26, the subject matter of any of Examples 15-25, wherein alerting the person includes providing a message to a mobile phone of the person.

In Example 27, the subject matter of any of Examples 15-26, wherein alerting the person includes actuating at least one of a visual, a haptic, or an auditory device proximate to the person.

In Example 28, the subject matter of any of Examples 15-27, wherein the fence is one of several fences, each fence corresponding to a class of objects, the object being in one class of the class of objects.

Example 29 is at least one machine readable medium including instructions for abandoned object detection, the instructions, when executed by processing circuitry, cause the processing circuitry to perform operations comprising: establishing a fence about a person; detecting an object within the fence; creating an entry in an object-person relationship data structure to establish a relationship between the person and the object within the fence; monitoring a position of the object until an indication is received that the fence is terminated; detecting, from the monitoring, that the object is outside of the fence; and alerting the person that the object is outside of the fence.

In Example 30, the subject matter of Example 29, wherein establishing the fence about the person includes registering the person at a vehicle at a beginning of a ride that the person is taking in the vehicle.

In Example 31, the subject matter of Example 30, wherein the fence is terminated when the ride completes.

In Example 32, the subject matter of any of Examples 29-31, wherein establishing the fence about the person includes dividing up a physical space based on a number of people occupying the physical space.

In Example 33, the subject matter of any of Examples 29-32, wherein detecting the object within the fence includes using a camera to detect and classify the object.

In Example 34, the subject matter of Example 33, wherein detecting the object includes measuring a distance between the person and the object.

In Example 35, the subject matter of Example 34, wherein creating the entry in the object-person relationship data structure includes storing the distance between the person and the object.

In Example 36, the subject matter of Example 35, wherein monitoring the object includes updating the entry in the object-person relationship data structure with an updated distance between the person and the object.

In Example 37, the subject matter of any of Examples 34-36, wherein detecting that the object is outside of the fence includes detecting that an updated position between the person and the object exceeds a threshold based on the fence.

In Example 38, the subject matter of Example 37, wherein the threshold includes a sensitivity factor that expands the fence.

In Example 39, the subject matter of any of Examples 33-38, wherein monitoring the position of the object includes repeatedly: shutting down the camera used to detect the object; using at least one of an accelerometer, a motion sensor, or a pressure sensor to detect a change in state of an environment about the person; and activating the camera to detect the object again and measure a distance between the person and the object.

In Example 40, the subject matter of any of Examples 29-39, wherein alerting the person includes providing a message to a mobile phone of the person.

In Example 41, the subject matter of any of Examples 29-40, wherein alerting the person includes actuating at least one of a visual, a haptic, or an auditory device proximate to the person.

In Example 42, the subject matter of any of Examples 29-41, wherein the fence is one of several fences, each fence corresponding to a class of objects, the object being in one class of the class of objects.

Example 43 is a system for abandoned object detection, the system comprising: means for establishing a fence about a person; means for detecting an object within the fence; means for creating an entry in an object-person relationship data structure to establish a relationship between the person and the object within the fence; means for monitoring a position of the object until an indication is received that the fence is terminated; means for detecting, from the monitoring, that the object is outside of the fence; and means for alerting the person that the object is outside of the fence.

In Example 44, the subject matter of Example 43, wherein the means for establishing the fence about the person include means for registering the person at a vehicle at a beginning of a ride that the person is taking in the vehicle.

In Example 45, the subject matter of Example 44, wherein the fence is terminated when the ride completes.

In Example 46, the subject matter of any of Examples 43-45, wherein the means for establishing the fence about the person include means for dividing up a physical space based on a number of people occupying the physical space.

In Example 47, the subject matter of any of Examples 43-46, wherein the means for detecting the object within the fence include means for using a camera to detect and classify the object.

In Example 48, the subject matter of Example 47, wherein the means for detecting the object include means for measuring a distance between the person and the object.

In Example 49, the subject matter of Example 48, wherein the means for creating the entry in the object-person relationship data structure include means for storing the distance between the person and the object.

In Example 50, the subject matter of Example 49, wherein the means for monitoring the object include means for updating the entry in the object-person relationship data structure with an updated distance between the person and the object.

In Example 51, the subject matter of any of Examples 48-50, wherein the means for detecting that the object is outside of the fence include means for detecting that an updated position between the person and the object exceeds a threshold based on the fence.

In Example 52, the subject matter of Example 51, wherein the threshold includes a sensitivity factor that expands the fence.

In Example 53, the subject matter of any of Examples 47-52, wherein the means for monitoring the position of the object include repeatedly applying: means for shutting down the camera used to detect the object; means for using at least one of an accelerometer, a motion sensor, or a pressure sensor to detect a change in state of an environment about the person; and means for activating the camera to detect the object again and measure a distance between the person and the object.

In Example 54, the subject matter of any of Examples 43-53, wherein the means for alerting the person include means for providing a message to a mobile phone of the person.

In Example 55, the subject matter of any of Examples 43-54, wherein the means for alerting the person include means for actuating at least one of a visual, a haptic, or an auditory device proximate to the person.

In Example 56, the subject matter of any of Examples 43-55, wherein the fence is one of several fences, each fence corresponding to a class of objects, the object being in one class of the class of objects.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:
1. A device comprising:
an interface to a sensor, the interface arranged to collect sensor data, wherein the sensor includes a camera;
a memory including instructions; and
processing circuitry that, when in operation, is configured by the instructions to:
establish a fence about a person;
detect, from the sensor data, an object within the fence, wherein, to detect the object within the fence, the processing circuitry uses sensor data from the camera to detect and classify the object;
create an entry in an object-person relationship data structure to establish a relationship between the person and the object within the fence;

monitor a position of the object until an indication is received that the fence is terminated, wherein, to monitor the position of the object, the processing circuitry repeatedly:
  shuts down the camera used to detect the object;
  uses at least one of an accelerometer, a motion sensor, or a pressure sensor to detect a change in state of an environment about the person; and
  activates the camera to detect the object again and measure a distance between the person and the object;
detect, from the monitoring, that the object is outside of the fence; and
alert the person that the object is outside of the fence.

2. The device of claim 1, wherein, to establish the fence about the person, the processing circuitry registers the person at a vehicle at a beginning of a ride that the person is taking in the vehicle.

3. The device of claim 2, wherein the fence is terminated when the ride completes.

4. The device of claim 1, wherein, to establish the fence about the person, the processing circuitry divides up a physical space based on a number of people occupying the physical space.

5. The device of claim 1, wherein, to detect the object, the processing circuitry measures a distance between the person and the object.

6. The device of claim 5, wherein, to create the entry in the object-person relationship data structure, the processing circuitry stores the distance between the person and the object.

7. The device of claim 6, wherein, to monitor the object, the processing circuitry updates the entry in the object-person relationship data structure with an updated distance between the person and the object.

8. The device of claim 5, wherein, to detect that the object is outside of the fence, the processing circuitry detects that an updated position between the person and the object exceeds a threshold based on the fence.

9. The device of claim 8, wherein the threshold includes a sensitivity factor that expands the fence.

10. The device of claim 1, wherein the fence is one of several fences, each fence corresponding to a class of objects, the object being in one class of the class of objects.

11. The device of claim 1, wherein, to the person, the processing circuitry provides a message to a mobile phone of the person.

12. The device of claim 1, wherein, to alert the person, the processing circuitry actuates at least one of a visual, a haptic, or an auditory device proximate to the person.

13. At least one non-transitory machine readable medium including instructions, the instructions, when executed by processing circuitry, cause the processing circuitry to perform operations comprising:
  establishing a fence about a person;
  detecting an object within the fence, wherein detecting the object within the fence includes using a camera to detect and classify the object;
  creating an entry in an object-person relationship data structure to establish a relationship between the person and the object within the fence;
  monitoring a position of the object until an indication is received that the fence is terminated, wherein monitoring the position of the object includes repeatedly:
    shutting down the camera used to detect the object;
    using at least one of an accelerometer, a motion sensor, or a pressure sensor to detect a change in state of an environment about the person; and
    activating the camera to detect the object again and measure a distance between the person and the object;
  detecting, from the monitoring, that the object is outside of the fence; and
  alerting the person that the object is outside of the fence.

14. The at least one machine readable medium of claim 13, wherein establishing the fence about the person includes registering the person at a vehicle at a beginning of a ride that the person is taking in the vehicle.

15. The at least one machine readable medium of claim 14, wherein the fence is terminated when the ride completes.

16. The at least one machine readable medium of claim 13, wherein establishing the fence about the person includes dividing up a physical space based on a number of people occupying the physical space.

17. The at least one machine readable medium of claim 13, wherein detecting the object includes measuring a distance between the person and the object.

18. The at least one machine readable medium of claim 17, wherein creating the entry in the object-person relationship data structure includes storing the distance between the person and the object.

19. The at least one machine readable medium of claim 18, wherein monitoring the object includes updating the entry in the object-person relationship data structure with an updated distance between the person and the object.

20. The at least one machine readable medium of claim 17, wherein detecting that the object is outside of the fence includes detecting that an updated position between the person and the object exceeds a threshold based on the fence.

21. The at least one machine readable medium of claim 20, wherein the threshold includes a sensitivity factor that expands the fence.

22. The at least one machine readable medium of claim 13, wherein the fence is one of several fences, each fence corresponding to a class of objects, the object being in one class of the class of objects.

23. The at least one machine readable medium of claim 13, wherein alerting the person includes providing a message to a mobile phone of the person.

24. The at least one machine readable medium of claim 13, wherein alerting the person includes actuating at least one of a visual, a haptic, or an auditory device proximate to the person.

* * * * *